United States Patent
Chang

(10) Patent No.: US 9,775,103 B2
(45) Date of Patent: Sep. 26, 2017

(54) METHOD OF DYNAMIC FREQUENCY SELECTION AND AN ELECTRONIC DEVICE EMPLOYING THE SAME

(71) Applicants: AMBIT MICROSYSTEMS (SHANGHAI) LTD., Shanghai (CN); HON HAI PRECISION INDUSTRY CO., LTD., New Taipei (TW)

(72) Inventor: Shu-Hao Chang, Taoyuan (TW)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 39 days.

(21) Appl. No.: 14/922,766

(22) Filed: Oct. 26, 2015

(65) Prior Publication Data

US 2017/0064595 A1 Mar. 2, 2017

(30) Foreign Application Priority Data

Aug. 27, 2015 (TW) ................................. 104128228

(51) Int. Cl.
*H04W 48/16* (2009.01)
(52) U.S. Cl.
CPC .................. *H04W 48/16* (2013.01)
(58) Field of Classification Search
CPC .............................. H04W 36/08; H04W 48/16
See application file for complete search history.

(56) References Cited

U.S. PATENT DOCUMENTS

| | | | | |
|---|---|---|---|---|
| 8,705,527 | B1* | 4/2014 | Addepalli | H04W 4/046 370/389 |
| 2010/0110949 | A1* | 5/2010 | Lundsgaard | H04W 48/16 370/311 |
| 2011/0096739 | A1* | 4/2011 | Heidari | H04W 72/085 370/329 |
| 2011/0205971 | A1 | 8/2011 | Ito | |
| 2013/0252640 | A1* | 9/2013 | Kenney | H04W 48/16 455/456.4 |
| 2015/0063147 | A1 | 3/2015 | Sadek | |

FOREIGN PATENT DOCUMENTS

| | | |
|---|---|---|
| CN | 1675954 A | 9/2005 |
| CN | 101635970 B | 7/2011 |
| CN | 104185224 A | 12/2014 |
| TW | 201512972 A | 4/2015 |

* cited by examiner

*Primary Examiner* — Duc C Ho
(74) *Attorney, Agent, or Firm* — Steven Reiss

(57) ABSTRACT

A method of dynamic frequency selection includes receiving setting information of a WI-FI unit input by an input unit, controlling the WI-FI unit in a STA working mode to switch different channels to scan an available access point AP with dynamic frequency selection within one channel when receiving the setting information of setting the WI-FI unit to work in an AP working mode and the STA working mode simultaneously, controlling the WI-FI unit in the AP working mode to switch to the channel within which the WI-FI unit in the STA working mode scans the available access point AP when the WI-FI unit in the STA working mode scans the available access point AP, and controlling the WI-FI unit in the AP working mode to communicate with a terminal device via the switched access point AP.

14 Claims, 5 Drawing Sheets

METHOD OF DYNAMIC FREQUENCY SELECTION AND AN ELECTRONIC DEVICE EMPLOYING THE SAME

CROSS-REFERENCE TO RELATED APPLICATIONS

This application claims priority to Taiwanese Patent Application No. 104128228 filed on Aug. 27, 2015, the contents of which are incorporated by reference herein.

FIELD

The subject matter herein generally relates to communication field, especially relates to a method of dynamic frequency selection and an electronic device employing the method.

BACKGROUND

In the prior art, a WI-FI device includes an Access Point (AP) working mode and a Station (STA) working mode. When a WI-FI device works in the AP working mode, the WI-FI device must have a Dynamic Frequency Selection (DFS) test. When a WI-FI device works in the STA working mode, the WI-FI device does not need to have the DFS test. DFS is a mechanism that allows unlicensed WI-FI devices to share a spectrum with existing radar systems (for example, weather radars at or near airports). A WI-FI device must scan channels sufficiently to determine whether a radar exists. If the WI-FI device working in the AP working mode detects the radar, the WI-FI device must drop the channel within a designated time.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
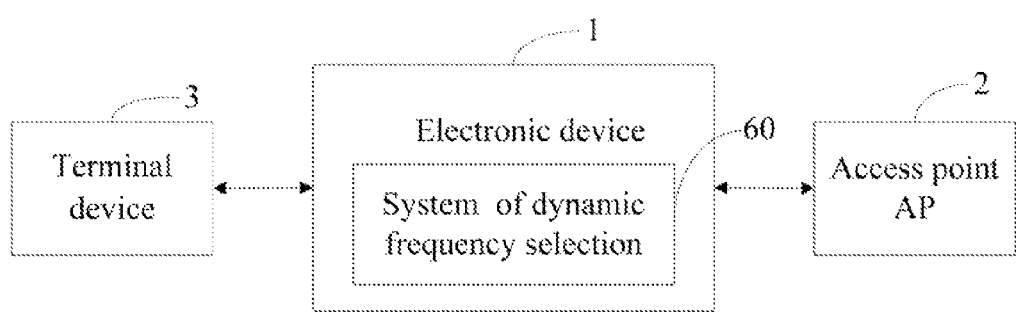
FIG. 1 is a block diagram of one embodiment of a running environment of a system of dynamic frequency selection.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of one embodiment of a running environment of a system 60 of dynamic frequency selection. The system 60 employs an electronic device 1 for operation. The electronic device 1 can communicate with an access point AP 2. Thus, the electronic device 1 can access a network, such as Internet via the access point AP 2. The electronic device 1 also can serve as an access point and communicate with a terminal device 3. The terminal device 3 can access a network via the electronic device 1 serving as the access point. The access point AP 2 has the DFS function. Namely, the access point AP 2 can scan channels sufficiently to determine whether a radar exists, and if the access point AP 2 detects the radar, the access point AP 2 must leave the channel within a designated time. In the embodiment, the electronic device 1 and the terminal device 3 can both be a smart phone, a tablet computer, a personal digital assistant (PDA), or other suitable WI-FI accessible device; the access point AP 2 can be a wireless router, a smart phone, a tablet computer, or other suitable WI-FI accessible device.

As a WI-FI accessible device with the DFS function is available technology, the present disclosure does not describe the WI-FI device with the DFS function in detail. For more details about the WI-FI accessible device with the DFS function reference can be made to Chinese patent application with filing date of Aug. 13, 2003 and with publication number CN1675954.

Figure 2:
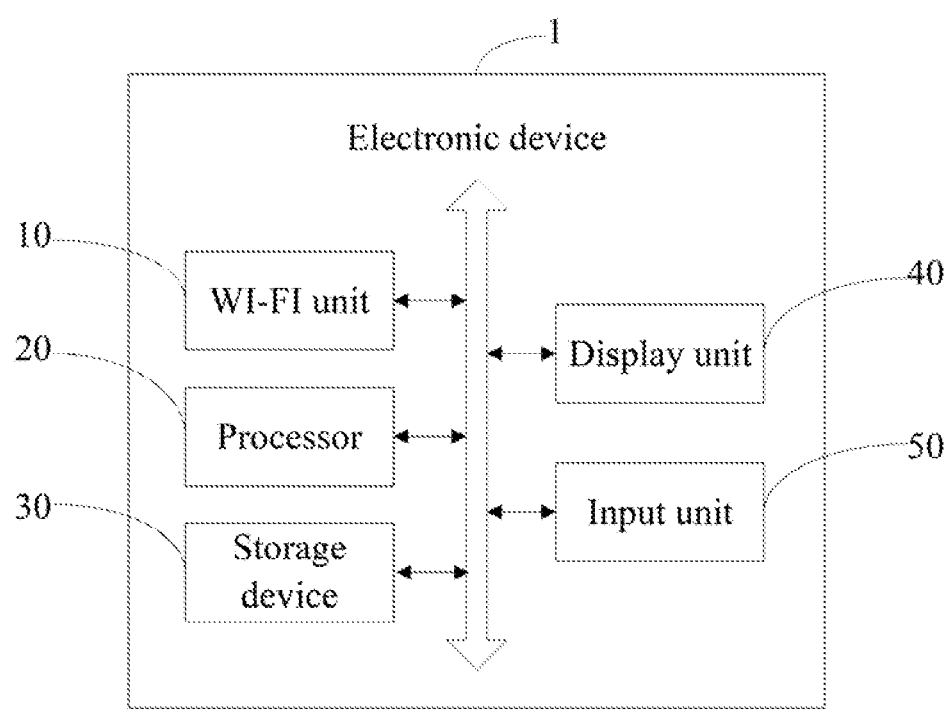
FIG. 2 is a block diagram of one embodiment of an electronic device of FIG. 1.

FIG. 2 illustrates a block diagram of one embodiment of the electronic device of FIG. 1. The electronic device 1 includes a WI-FI unit 10, at least one processor 20, a storage device 30, a display unit 40, and an input unit 50. The WI-FI unit 10 can work in an AP working mode and a STA working mode. When the WI-FI unit 10 of the electronic device 1 works in the AP working mode, the electronic device 1 serves as an access point and the terminal device 3 can communicate with the electronic device 1 serving as the access point. When the WI-FI unit 10 of the electronic device 1 works in the STA working mode, the electronic device 1 can communicate with the access point AP 2. In the embodiment, the WI-FI unit 10 is a WI-FI chip.

Figure 4:
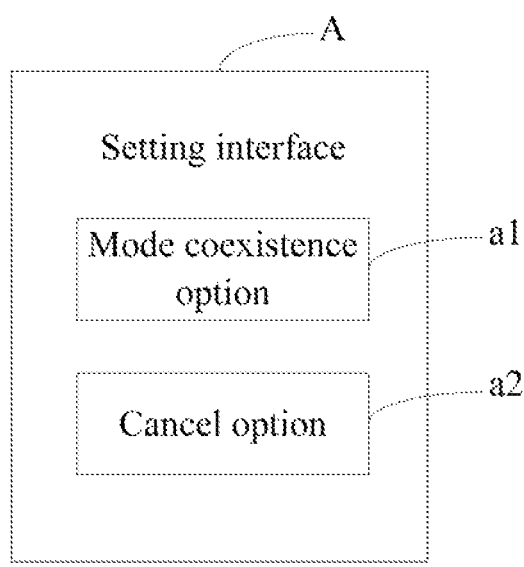
FIG. 4 is a diagrammatic view of one embodiment of setting interface.

FIG. 4 illustrates a diagrammatic view of one embodiment of a setting interface A. The display unit 40 is used to display the setting interface A. The setting interface A is used for a user to set working modes of the WI-FI unit 10 via the input unit 50. In one embodiment, the display unit 40 and the input unit 50 can be an integral device, such as a touch screen. In another embodiment, the display unit 40 is a display screen, and the input unit 50 is a keyboard or a touch pad.

In at least one embodiment, the storage device 30 can include various types of non-transitory computer-readable storage mediums. For example, the storage device 30 can be an internal storage system, such as a flash memory, a random access memory (RAM) for temporary storage of information, and/or a read-only memory (ROM) for permanent storage of information. The storage device 30 can also be an external storage system, such as a hard disk, a storage card, or a data storage medium. The at least one processor 20 can be a central processing unit (CPU), a microprocessor, or other data processor chip that performs functions of the system 60 of dynamic frequency selection in the electronic device 1.

Figure 3:
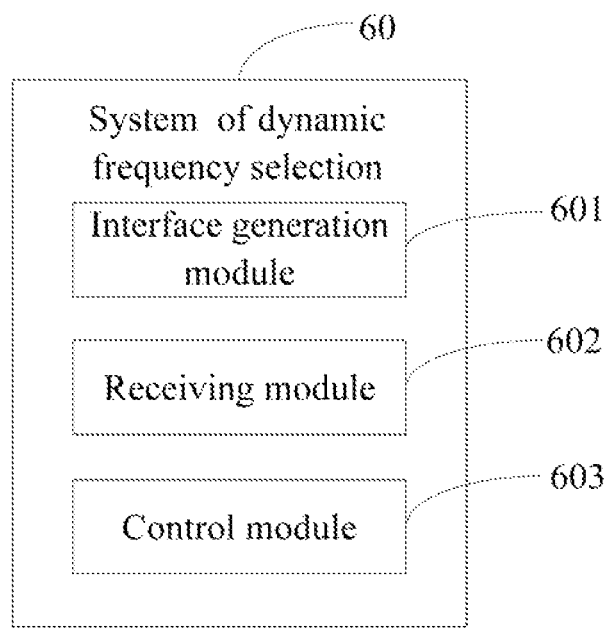
FIG. 3 is a block diagram of one embodiment of the system of dynamic frequency selection of FIG. 1.

FIG. 3 illustrates a block diagram of one embodiment of the system 60 of dynamic frequency selection. In at least one embodiment, the system 60 can include an interface generation module 601, a receiving module 602, and a control module 603. The modules 601-603 of the system 60 can be collections of software instructions stored in the storage device 30 of the electronic device 1 and executed by the processor 20 of the electronic device 1. The modules 601-603 of the system 60 also can include functionality represented as hardware or integrated circuits, or as software and hardware combinations, such as a special-purpose processor or a general-purpose processor with special-purpose firmware.

The interface generation module 601 is used to generate the setting interface A which is used to set setting information of the WI-FI unit 10, and display the setting interface A on the display unit 40. A user can input the setting information on the setting interface A displayed on the display unit 40 via the input unit 10. FIG. 4 illustrates in at least one embodiment, the setting interface generated by the interface generation module 601 includes a mode coexistence option a1 and a cancel option a2. In at least one embodiment, the user can select the mode coexistence option a1 to set the WI-FI unit 10 to work in the AP working mode and STA working mode simultaneously. The user can select the cancel option a2 to disable the WI-FI unit 10.

The receiving module 602 is used to receive the setting information of the WI-FI unit 10 input by the input unit 50.

The control module 603 is used to control the WI-FI unit 10 in the STA working mode to switch different channels to scan an available access point AP 2 within one channel when the receiving module 602 receives the setting information of setting the WI-FI unit 10 as the AP working mode and STA working mode simultaneously. When the WI-FI unit 10 in the STA working mode scans an available access point AP 2, the control module 603 further controls the WI-FI unit 10 in the STA working mode to communicate with the scanned access point AP 2 via the channel within which the available access point AP 2 is scanned, controls the WI-FI unit 10 in the AP working mode to switch to the channel within which the WI-FI unit 10 in the STA working mode scans the available access point AP 2, and controls the WI-FI unit 10 in the AP working mode to communicate with the terminal device 3 via the switched access point AP 2.

As to how a WI-FI accessible device can switch different channels to scan available access points within one channel is available technology, the present disclosure does not describe such technology. For more details about how the WI-FI device switches different channels to scan the available access points within one channel reference can be made to Chinese patent application with filing date of Jan. 27, 2010 and with publication number CN101635970.

As mentioned above, the access point AP 2 has a DFS function, so when the control module 603 controls the WI-FI unit 10 in the STA working mode to scan one available access point AP 2 and controls the WI-FI unit 10 in the STA working mode to communicate with the scanned access point AP 2 via the switched channel within which the available access point AP 2 is scanned, there is no radar information within the switched channel. Therefore, when the control module 603 controls the WI-FI unit 10 in the AP working mode to switch to the channel within which the WI-FI unit 10 in the STA working mode scans the available access point AP 2, and controls the WI-FI unit 10 in the AP working mode to communicate with the terminal device 3 via the switched channel, there is also no radar information within the channel via which the WI-FI unit 10 in the AP working mode can communicate with the terminal device 3. Namely, the WI-FI unit 10 in the AP working mode indirectly has the DFS function when the control module 603 controls the WI-FI unit 10 in the AP working mode to switch to the channel within which the WI-FI unit 10 in the STA working mode scans the available access point AP 2, and controls the WI-FI unit 10 in the STA working mode to communicate with the terminal device 3 via the switched channel. Thus, the present disclosure can reduce the complex of structure of the electronic device 1 and the difficulty of layout and heat radiation of circuit in the electronic device 1.

The control module 603 is also used to detect whether the WI-FI unit 10 in the STA working mode communicates with the access point AP 2. When the control module 603 determines the WI-FI unit 10 in the STA working mode fails to communicate with the access point AP 2, the control module 603 further controls the WI-FI unit 10 in the STA working mode to switch to another channel to scan available access points AP 2 within one channel. When the control module 603 controls the WI-FI unit 10 in the STA working mode to scan one available access point AP 2, the control module 603 controls the WI-FI unit 10 in the AP working mode to switch to the channel within which the available access point AP 2 is scanned, and communicate with the terminal device 3 via the switched channel.

When the WI-FI unit 10 in the STA working mode scans one available access point AP 2 in a default time, the control module 603 controls the WI-FI unit 10 in the STA working mode to communicate with the scanned available access point AP 2 via the channel within which the available access point AP 2 is scanned, controls the WI-FI unit 10 in the AP working mode to switch to the channel within which the available access point AP 2 is scanned, and controls the WI-FI unit 10 in the AP working mode to communicate with the terminal device 3 via the switched channel.

When the WI-FI unit 10 in the STA working mode fails to scan one available access point AP 2 in a default time, the control module 603 controls the WI-FI unit 10 in the AP working mode to switch to the channel of 2.4 GHz or other Unauthorized National Information Infrastructure (NUN-UNII) channels. The control module 603 further controls the WI-FI unit 10 in the AP working mode to communicate with the terminal device 3 via the channel of 2.4 GHz or other NUN-UNII channels. In at least one embodiment, the default time can be set according to the need or configuration of the electronic device 1.

In another embodiment, when the control module 603 determines the WI-FI unit 10 in the STA working mode fails to communicate with the access point AP 2, the control module 603 controls the WI-FI unit 10 in STA working mode to switch another channel to scan the available access point AP 2 and controls the WI-FI unit 10 in AP working mode to switch channel the same way as the WI-FI unit 10 in STA working mode does.

The control module 603 disables the function of the WI-FI unit 10 when the receiving module 602 receives the setting information of disabling the WI-FI unit 10.

Figure 5:
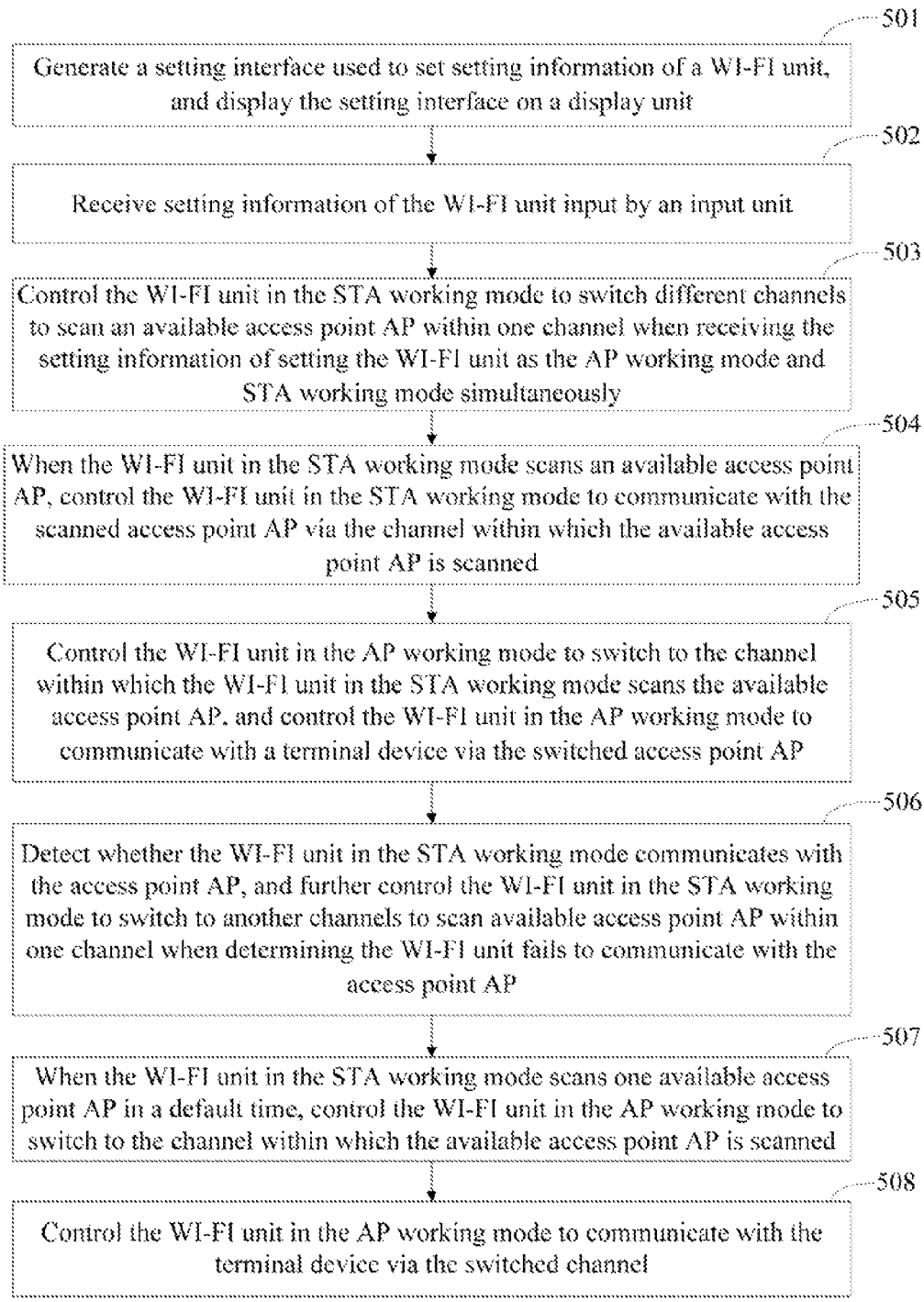
FIG. 5 illustrates a flowchart of one embodiment of a method of dynamic frequency selection.

FIG. 5 illustrates a flowchart of a method of dynamic frequency selection. The method is provided by way of example, as there are a variety of ways to carry out the method. The method described below can be carried out using the configurations illustrated in FIG. 1-4, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, an interface generation module generates a setting interface used to set setting information of a WI-FI unit, and displays the setting interface on a display unit. FIG. 4 illustrates in at least one embodiment, the setting interface generated by the interface generation module includes a mode coexistence option and a cancel option. In at least one embodiment, a user can select the mode coexistence option to set the WI-FI unit to work in AP working mode and STA working mode simultaneously. The user can select the cancel option to disable the WI-FI unit.

At block 502, a receiving module receives setting information of the WI-FI unit input by an input unit.

At block 503, a control module controls the WI-FI unit in the STA working mode to switch different channels to scan an available access point AP within one channel when receiving the setting information of setting the WI-FI unit as the AP working mode and STA working mode simultaneously.

At block 504, when the WI-FI unit in the STA working mode scans an available access point AP, the control module further controls the WI-FI unit in the STA working mode to communicate with the scanned access point AP via the channel within which the available access point AP is scanned.

At block 505, the control module controls the WI-FI unit in the AP working mode to switch to the channel within which the WI-FI unit in the STA working mode scans the available access point AP, and controls the WI-FI unit in the AP working mode to communicate with a terminal device via the switched access point AP.

At block 506, the control module detects whether the WI-FI unit in the STA working mode communicates with the access point AP, and further controls the WI-FI unit in the STA working mode to switch to another channel to scan available access points AP within one channel when the control module determines the WI-FI unit fails to communicate with the access point AP.

At block 507, when the WI-FI unit in the STA working mode scans one available access point AP in a default time, the control module controls the WI-FI unit in the AP working mode to switch to the channel within which the available access point AP is scanned.

At block 508, the control module controls the WI-FI unit in the AP working mode to communicate with the terminal device via the switched channel.

In at least one embodiment, the method of block 507 further includes: when the control module fails to scan one available access point AP in the default time, the control module controls the WI-FI unit in the AP working mode to switch to the channel of 2.4 GHz or other Unauthorized National Information Infrastructure (NUN-UNII) channels.

In at least one embodiment, the method of block 503 further includes: the control module disabling the function of the WI-FI unit when the receiving module receives the setting information of disabling the WI-FI unit.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device with dynamic frequency selection, comprising:
   an input unit;
   at least one processor coupled to the input unit;
   a WI-FI unit coupled to the at least one processor configured to work in an AP working mode and a STA working mode;
   a non-transitory storage medium coupled to the at least one processor and configured to store a plurality of instructions, which cause the device to:
   receive setting information of the WI-FI unit input by the input unit;
   control the WI-FI unit in the STA working mode to switch different channels to scan an available access point AP within one channel when receiving the setting information of setting the WI-FI unit to work in the AP working mode and the STA working mode simultaneously;
   when the WI-FI unit in the STA working mode scans the available access point AP, control the WI-FI unit in the STA working mode to communicate with the scanned access point AP via the one channel within which the available access point AP is scanned;
   control the WI-FI unit in the AP working mode to switch to the one channel within which the WI-FI unit in the STA working mode scans the available access point AP; and
   control the WI-FI unit in the AP working mode to communicate with a terminal device via the one channel within which the WI-FI unit in the STA working mode scans the available access point AP.

2. The electronic device as recited in claim 1, wherein the plurality of instructions are further configured to cause the electronic device to:
   detect whether the WI-FI unit in the STA working mode communicates with the access point AP.

3. The electronic device as recited in claim 2, wherein the plurality of instructions are further configured to cause the electronic device to:

when determining the WI-FI unit in the STA working mode fails to communicate with the access point AP, control the WI-FI unit in the STA working mode to switch to another channel to scan one available access point AP.

4. The electronic device as recited in claim 3, wherein the plurality of instructions are further configured to cause the electronic device to:

when the WI-FI unit in the STA working mode scans one available access point AP in a default time, control the WI-FI unit in the STA working mode to communicate with the scanned available access point AP via the channel within which the available access point AP is scanned; and control the WI-FI unit in the AP working mode to switch to the channel within which the available access point AP is scanned, and control the WI-FI unit in the AP working mode to communicate with the terminal device via the switched channel.

5. The electronic device as recited in claim 2, wherein the plurality of instructions are further configured to cause the electronic device to:

when determining the WI-FI unit in the STA working mode fails to scan one available access point AP in a default time, control the WI-FI unit in the AP working mode to switch to the channel of 2.4 GHz or other NUN-UNII channels.

6. The electronic device as recited in claim 1, wherein the electronic device further comprises a display unit, the plurality of instructions are further configured to cause the electronic device to:

generate a setting interface configured to set the setting information of the WI-FI unit, and display the setting interface on the display unit.

7. The electronic device as recited in claim 1, wherein the plurality of instructions are further configured to cause the device to:

disable the function of the WI-FI unit when receiving setting information of disabling the WI-FI unit.

8. A method of dynamic frequency selection comprises:
receiving setting information of a WI-FI unit input by an input unit;
controlling the WI-FI unit in a STA working mode to switch different channels to scan an available access point AP with dynamic frequency selection within one channel when receiving the setting information of setting the WI-FI unit to work in an AP working mode and the STA working mode simultaneously;

when the WI-FI unit in the STA working mode scans the available access point AP, controlling the WI-FI unit in the STA working mode to communicate with the scanned access point AP via the one channel within which the available access point AP is scanned;

controlling the WI-FI unit in the AP working mode to switch to the one channel within which the WI-FI unit in the STA working mode scans the available access point AP; and controlling the WI-FI unit in the AP working mode to communicate with a terminal device via the one channel within which the WI-FI unit in the STA working mode scans the available access point AP.

9. The method as recited in claim 8, further comprises:
detecting whether the WI-FI unit in the STA working mode communicates with the access point AP.

10. The method as recited in claim 9, further comprises:
when determining the WI-FI unit in the STA working mode fails to communicate with the access point AP, controlling the WI-FI unit in the STA working mode to switch to another channel to scan one available access point AP.

11. The method as recited in claim 10, further comprises:
when the WI-FI unit in the STA working mode scans one available access point AP in a default time, controlling the WI-FI unit in the STA working mode to communicate with the scanned available access point AP via the channel within which the available access point AP is scanned; and controlling the WI-FI unit in the AP working mode to switch to the channel within which the available access point AP is scanned, and controlling the WI-FI unit in the AP working mode to communicate with the terminal device via the switched channel.

12. The method as recited in claim 9, further comprises:
when determining the WI-FI unit in the STA working mode fails to scan one available access point AP in a default time, controlling the WI-FI unit in the AP working mode to switch to the channel of 2.4 GHz or other NUN-UNII channels.

13. The method as recited in claim 8, further comprises:
generate a setting interface configured to set the setting information of the WI-FI unit, and display the setting interface on a display unit.

14. The method as recited in claim 8, further comprises:
disabling the function of the WI-FI unit when receiving setting information of disabling the WI-FI unit.

* * * * *